United States Patent [19]

Schauwecker et al.

[11] Patent Number: 4,695,928
[45] Date of Patent: Sep. 22, 1987

[54] FRAME FOR HEADLIGHTS OF MOTOR VEHICLES

[75] Inventors: Friedrich Schauwecker, Pfullingen; Walter Weber, Reisensburg, both of Fed. Rep. of Germany

[73] Assignee: Robert Bosch GmbH, Stuttgart, Fed. Rep. of Germany

[21] Appl. No.: 893,891

[22] Filed: Jul. 29, 1986

[30] Foreign Application Priority Data

Aug. 31, 1985 [DE] Fed. Rep. of Germany ....... 3531220

[51] Int. Cl.⁴ .............................................. B60Q 1/00
[52] U.S. Cl. ..................................... 362/61; 362/267; 362/277
[58] Field of Search ...................... 362/61, 64, 65, 80, 362/406, 418, 267, 277, 306

[56] References Cited

U.S. PATENT DOCUMENTS 4,249,232 2/1981 Dick ...................................... 362/61
4,556,931 12/1985 Wheatley .............................. 362/61

FOREIGN PATENT DOCUMENTS 3001925 7/1981 Fed. Rep. of Germany ........ 362/61
2029954 3/1980 United Kingdom ................... 362/61

Primary Examiner—James C. Yeung
Attorney, Agent, or Firm—Michael J. Striker

[57] ABSTRACT

A frame for a headlight of a motor vehicle includes a connecting element of thermoplastics secured to a transparent pane of the headlight, and a screening element of rubber which is non-releasably connected to the connecting element. The frame engages the housing of the headlight and is supported on the transparent pane. The frame has a ring-shaped bead abutting against the pane and a ring-shaped lip lying on the body of the motor vehicle.

7 Claims, 4 Drawing Figures

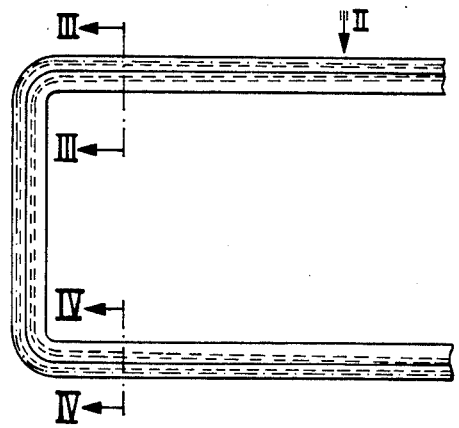
FIG. 1
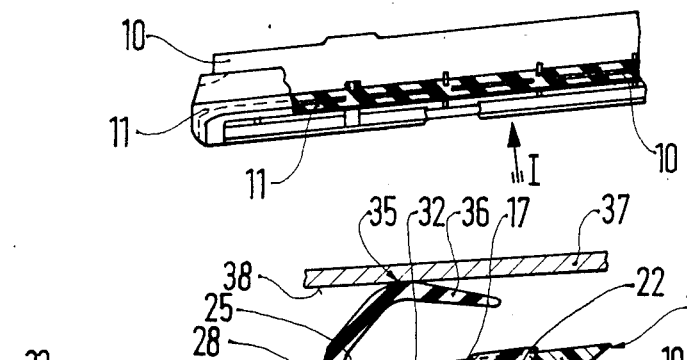
FIG. 2
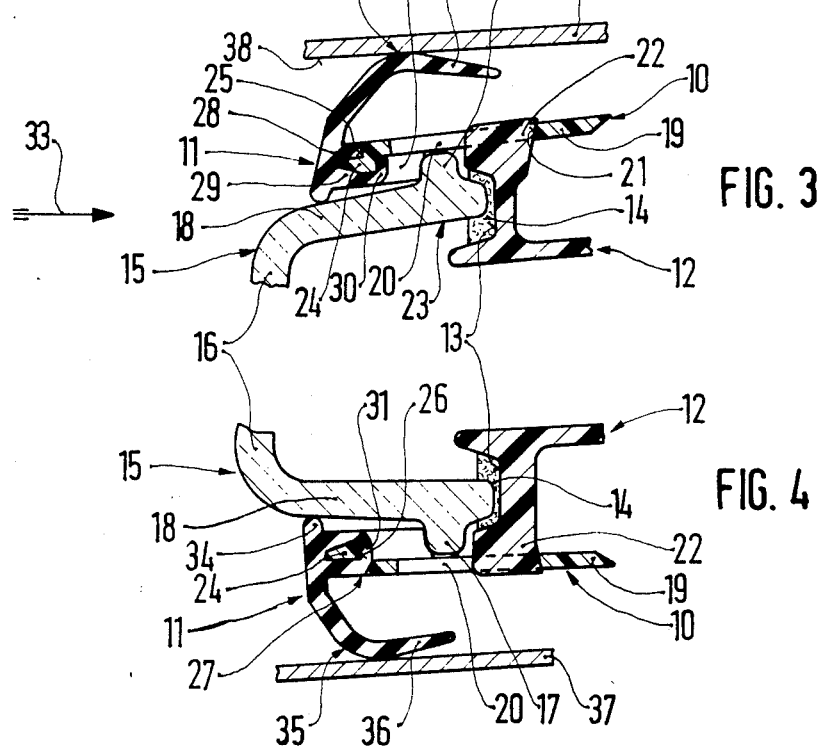
FIG. 3
FIG. 4

FRAME FOR HEADLIGHTS OF MOTOR VEHICLES

BACKGROUND OF THE INVENTION

The present invention relates to a frame for headlights utilized in motor vehicles. This frame covers a gap between the headlight and the body of the vehicle.

The frame of the foregoing type must be sufficiently stiff for its connection to the support, and on the other hand, it must have a sufficient elasticity to compensate for tolerances between the headlight and the vehicle body. Such frames, however do meet both requirements sufficiently, particularly at extreme ambient temperatures.

SUMMARY OF THE INVENTION

It is an object of the present invention to provide an improved frame for a headlight of a motor vehicle.

It is another object of the invention to provide a frame which is easy to manufacture and reliable in function.

The invention is based on the idea that a favorable material is utilized for the frame to fulfil both above described functions of the frame.

The objects of the present invention are attained by a frame for headlights of motor vehicles for covering a gap between a reflector of a headlight and a body of the vehicle, the frame comprising a connection member, and a screening member connected to said connection member in a locking fashion.

The connection member may be made of thermoplastics while the screening member may be made of rubber. Thereby the frame sealingly covers the gap between the headlight and the vehicle body.

When the headlight has a housing secured to the body of the vehicle and a transparent pane which extends through an opening in the body of the vehicle, the connection element may have a plurality of openings each forming a shoulder, the housing of the headlight having a plurality of projections extending inwardly from said transparent pane whereby, upon the insertion of the frame into its functional position in the body of the vehicle, each shoulder engages with a respective projection.

If the transparent pane has a foot formed with an outer ring-shaped shoulder the screening member may have bumps projecting in a direction of insertion of the frame, said bumps pressing against said ring-shaped shoulder in the functional position of the frame. Thereby a reliable locking connection of both parts of the frame is obtained.

When the transparent pane has a front plate and an annular flange between said front plate and said foot, the screen member may have an annular bead abutting against said flange and a ring-shaped lip lying on the body of the vehicle.

Said lip may be of V-shape in cross-section and have an inwardly protruding free leg which, upon the insertion of the frame into said functional position, lies on an outer side of the body of the vehicle.

The connection member may have a locking ring which is bent inwardly thereof, said locking ring having an outer shoulder and an inner shoulder, said screening member having a ring-shaped groove receiving said locking ring, said groove having a first side supported against said outer shoulder and a second side engaging said inner shoulder by means of a ring-shaped hook formed in one piece with said inner shoulder. Thus the locking connection may be obtained of both frame parts which are also easy to manufacture and assemble.

The connection element may be a substantially flat body having an offset region wherein said flat body is provided with a plurality of perforations, said screening member having a lug surrounding said locking ring, said first and second sides of the groove being connected to said lug by a number of crosspieces. A non-releasable locking of two parts of the frame is thereby ensured.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWINGS

FIG. 1 is a front view of the portion of the frame for a headlight according to the invention, on a reduced scale;

FIG. 2 is a view as seen in the direction of arrow II of FIG. 1; FIG. 3 is a cross-sectional view taken along line III—III of FIG. 1 through the upper leg of the frame, on an enlarged scale; and FIG. 4 is a cross-sectional view taken along line IV—IV of FIG. 1, through the lower leg of the frame, on an enlarged scale.

DETAILED DESCRIPTION OF THE PREFERRED EMBODIMENT

FIGS. 1 and 2 illustrate only a portion of a rectangular frame for a headlight for motor vehicles. The frame according to the invention is comprised of a closed connection member 10 made of thermoplastic material, and a screening member 11 which is made of rubber.

FIGS. 3 and 4 show a portion of the headlight, the housing 12 of which has a ring-shaped adhesive bed 13 receiving a sealing compound 14. A plurality of projections 22 formed at the inner side of the housing 12 are provided on the circumference of the ring-shaped bed 13. A transparent pane 15 has a front plate 16, a conical annular flange 18 connected to the front plate and a foot 23 secured in the adhesive bed 13 and having an outer annular shoulder 17.

The connection member 10 is formed as a substantially flat body 19. This flat body 19 is provided with a plurality of openings 20 forming shoulders 21. The outer edge of the body 19 overlaps an inwardly bent locking ring 24, whereby an outer shoulder 25 and an inner shoulder 26 are formed. The locking ring 24 is pierced so that a plurality of perforations 27 are distributed over the periphery thereof so that the locking ring 24 is subdivided into a respective number of portions.

The connection member 10 has an annular groove formed by a first groove side 28 and a second groove side 29. This annular groove receives the locking ring 24 whereby the first groove side 28 supports shoulder 25 and the second groove side 29 engages the inner shoulder 26 by means of a ring-shaped hook 30 formed of one piece with that shoulder. In the region of each perforation 27, cross-pieces 31 connect both groove sides 28 and 29 with a lug surrounding the locking ring 24 whereby a non-releasable locking connection of two parts 10 and 11 is obtained.

The screening member 11 has bumps 32 projecting in the direction of insertion of the frame according to arrow 33, these bumps pressing against the annular shoulder 17 of the transparent pane 15 in the operational position of the frame and thereby in cooperation of the shoulder 21 with projection 22, secure the frame of the headlight against shaking. The screening member 11 further has an annular bead 34, which lies against the annular flange 18 of the transparent pane 15, and an outwardly projecting ring-shaped lip 35. The latter is formed with an inwardly directed free leg 36 which is of V-shape in cross-section.

Housing 12 of the headlight is secured to a vehicle body 37 (FIG. 4) in the known non-illustrated fashion, and the transparent pane 15 extends through an opening 38 of the vehicle body. Upon the insertion of the frame in the direction of arrow 33 (FIG. 3) the leg or projection 36 of the annular lip 35 comes into contact with the vehicle body 37, and deflection of this projection inwardly follows.

It will be understood that each of the elements described above, or two or more together, may also find a useful application in other types of frames for headlights of motor vehicles differing from the types described above.

While the invention has been illustrated and described as embodied in a frame for headlight of motor vehicles, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects in this invention.

What is claimed as new and desired to be protected by Letters Patent is set forth in the appended claims:

1. A frame for headlights of motor vehicles for covering a gap between a reflector of a headlight and a body of the vehicle, the frame comprising a connection member, and a screening member connected to said connection member in a locking fashion, the headlight having a housing secured to the body of the vehicle and a transparent pane which extends through an opening in the body of the vehicle, said connection member having a plurality of openings (20) each forming a shoulder (21), the housing of the headlight having a plurality of projections (22) extending inwardly from said transparent pane (15) whereby, upon the insertion of the frame into its functional position in the body of the vehicle, each shoulder engages with a respective projection.

2. The frame as defined in claim 1, wherein said connection member is made of thermoplastics and said screening member is made of rubber.

3. The frame as defined in claim 1, wherein said transparent pane has a foot formed with an outer ring-shaped shoulder (17), said screening member having bumps (32) projecting in a direction of insertion of the frame, said bumps pressing against said ring-shaped shoulder in the functional position of the frame.

4. The frame as defined in claim 3, wherein said transparent pane has a front plate and an annular flange between said front plate and said foot, said screening member having an annular bead (34) abutting against said flange and a ring-shaped lip (35) lying on the body of the vehicle.

5. The frame as defined in claim 4, wherein said lip is of V-shape in cross-section and has an inwardly protruding free leg (36) which, upon the insertion of the frame into said functional position, lies on an outer side of the body of the vehicle.

6. The frame as defined in claim 1, wherein said connection member has a locking ring (24) which is bent inwardly thereof, said locking ring having an outer shoulder (25) and an inner shoulder (26), said screening member having a ringshaped groove receiving said locking ring, said groove having a first side (28) supported against said outer shoulder and a second side (29) engaging said inner shoulder (26) by means of a ring-shaped hook (30) formed in one piece with said inner shoulder 7. The frame as defined in claim 6, said connection member being a substantially flat body (19) having an offset region, wherein said flat body is provided with a plurality of perforations (27), said screening member having a lug surrounding said locking ring, said first and second sides of the groove being connected to said lug by a number of cross-pieces (31).

* * * * *